(12) United States Patent
Pank

(10) Patent No.: US 6,264,835 B1
(45) Date of Patent: Jul. 24, 2001

(54) APPARATUS FOR SEPARATING A LIGHT FROM A HEAVY FLUID

(76) Inventor: Thomas E Pank, 10546 Harp Rd., Walkersville, MD (US) 21793

( * ) Notice: Subject to any disclaimer, the term of this patent is extended or adjusted under 35 U.S.C. 154(b) by 0 days.

(21) Appl. No.: 09/303,416

(22) Filed: May 3, 1999

Related U.S. Application Data

(60) Provisional application No. 60/117,910, filed on Jan. 29, 1999.

(51) Int. Cl.[7] ................................. C02F 1/40; E03F 5/16
(52) U.S. Cl. ...................... 210/170; 210/254; 210/532.1; 210/540
(58) Field of Search ..................................... 210/170, 154, 210/254, 257.1, 521, 532.1, 538, 540, DIG. 5

(56) References Cited

U.S. PATENT DOCUMENTS

| | | |
|---|---|---|
| 1,778,326 | 10/1930 | Kutzer . |
| 2,820,550 | 1/1958 | Sorg ..................................... 210/519 |
| 3,258,123 | 6/1966 | Fontaine ............................... 210/259 |
| 3,282,436 | 11/1966 | Malm .................................. 210/532.1 |
| 3,374,894 | 3/1968 | Webster ............................. 210/532.1 |

(List continued on next page.)

FOREIGN PATENT DOCUMENTS 2127319A  4/1984 (GB) .

OTHER PUBLICATIONS

PCT International Publication No. WO7/27145 published Jul. 31, 1997.
Printed Publication: Technical and Design Manual, Nov. 1997.
Printed Publication: Technical and Design Manual, May 29, 1998.

Primary Examiner—David A. Simmons
Assistant Examiner—Frank M. Lawrence
(74) Attorney, Agent, or Firm—William D. Hall

(57) ABSTRACT

Apparatus for separating oil from water is provided. A container has a divider which divides the container into two tanks. These two tanks have three separate paths for the incoming run-off water, one path for a low rate of flow of the run-off water, one for an intermediate rate of flow of the water and one for a high rate of flow. The divider is a resilient plate which relies on its resilience to hold the plate in the container. The divider is a large vortex plate that divides the space in the tank. That space has a lower level than the lower end of the vortex plate. That space allows water to flow under the vortex plate to the part of the tank outside of the vortex plate. An inlet pipe feeds raw run-off water into the upper space. When water enters the container at a slow rate, it passes through a weir to an outlet. When the run-off fluid has an intermediate rate of flow more water enters the inlet tank than can pass through the small opening of the weir. Hence, the level of the fluid within the vortex plate will rise forcing clean water out of the lower end of the space within the vortex plate. This clean water will then flow to the outlet pipe. When the rate of flow of the incoming run-off water is very high, the water passes, over the vortex plate of the inlet tank, directly to the outlet. The vortex plate in the main separation tank improves the separation process in that tank. The fluid enters that tank in a space defined by the vortex plate. Clean water is fed from the main separation tank to the clean water outlet of the apparatus.

27 Claims, 15 Drawing Sheets

U.S. PATENT DOCUMENTS

| | | | |
|---|---|---|---|
| 3,862,040 | 1/1975 | Preus et al. ............................ | 210/253 |
| 3,904,524 | 9/1975 | Pelton et al. .......................... | 210/170 |
| 4,039,458 | 8/1977 | Maisonneuve ....................... | 210/513 |
| 4,136,010 | 1/1979 | Pille et al. ............................ | 210/164 |
| 4,238,333 | 12/1980 | Tidwell ................................ | 210/800 |
| 4,363,731 | 12/1982 | Filippi ............................... | 210/532.1 |
| 4,385,986 | 5/1983 | Jaisinghani et al. ................. | 210/538 |
| 4,396,508 | 8/1983 | Broughton .......................... | 210/187 |
| 4,578,188 | 3/1986 | Cousino .............................. | 210/170 |
| 4,684,467 | 8/1987 | Cloud .................................. | 210/519 |
| 4,985,148 | 1/1991 | Monteith ............................. | 210/519 |
| 5,122,280 | 6/1992 | Russell et al. ....................... | 210/745 |
| 5,143,611 | 9/1992 | Pate, Jr. ............................... | 210/256 |
| 5,196,123 | 3/1993 | Guthy .................................. | 210/663 |
| 5,246,592 | 9/1993 | Schweizer et al. .................. | 210/708 |
| 5,405,538 | 4/1995 | Batten ................................. | 210/744 |
| 5,433,845 | 7/1995 | Greene et al. ....................... | 210/170 |
| 5,498,331 | 3/1996 | Monteith ............................. | 210/170 |
| 5,531,888 | 7/1996 | Geiger et al. ........................ | 210/162 |
| 5,543,038 | * 8/1996 | Johannessen ........................ | 210/417 |
| 5,746,911 | 5/1998 | Pank .................................... | 210/170 |
| 5,759,415 | * 6/1998 | Adams ................................. | 210/776 |
| 6,079,571 | * 6/2000 | Stowell ................................ | 210/521 |
| 6,120,684 | * 9/2000 | Kistner et al. ....................... | 210/163 |

* cited by examiner

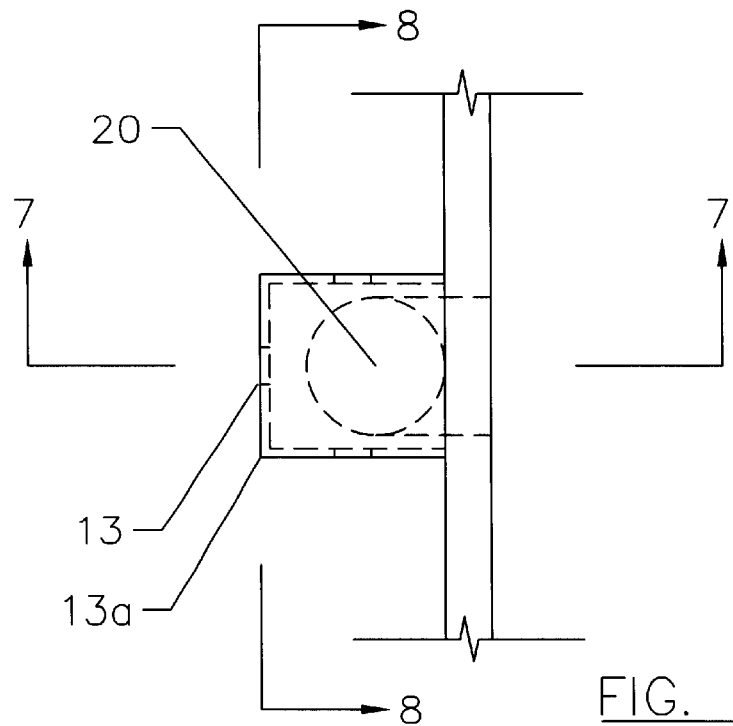
FIG. 6
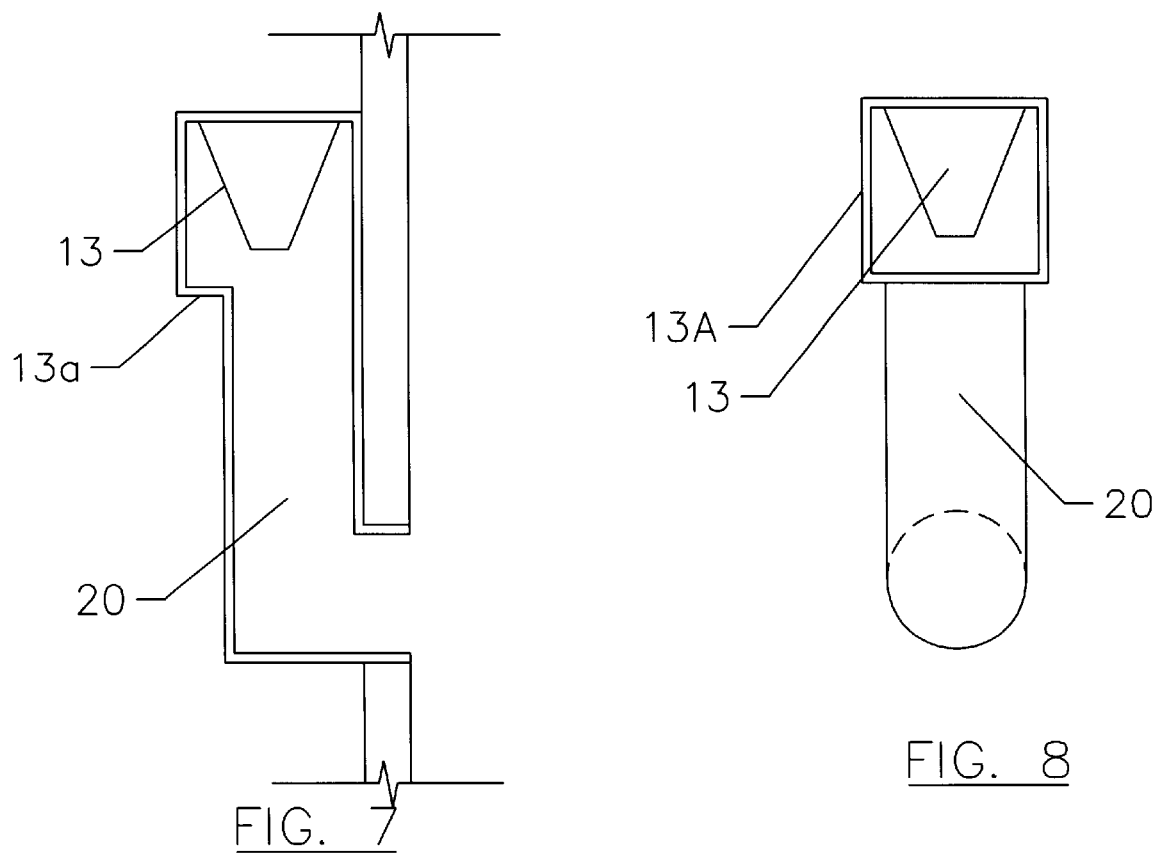
FIG. 7
FIG. 8

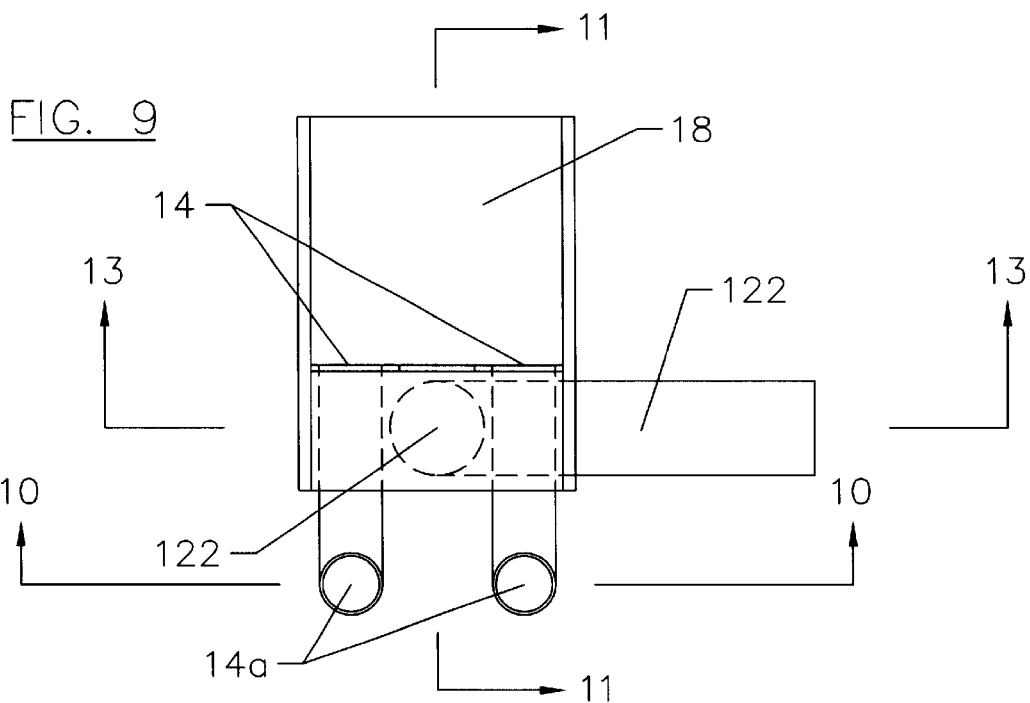
FIG. 9
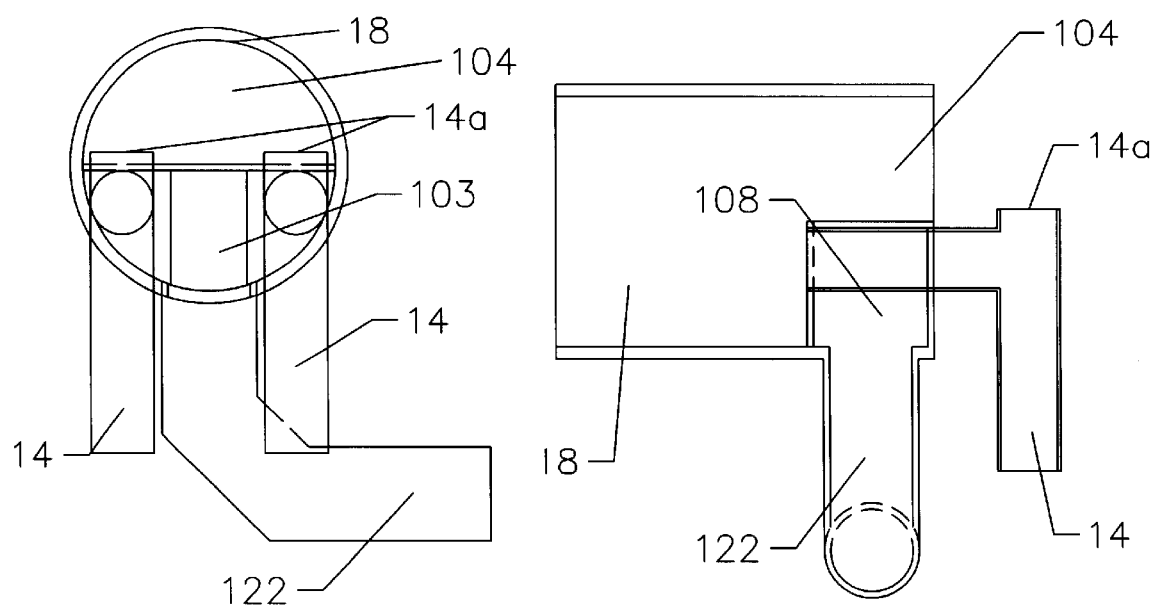
FIG. 10
FIG. 11

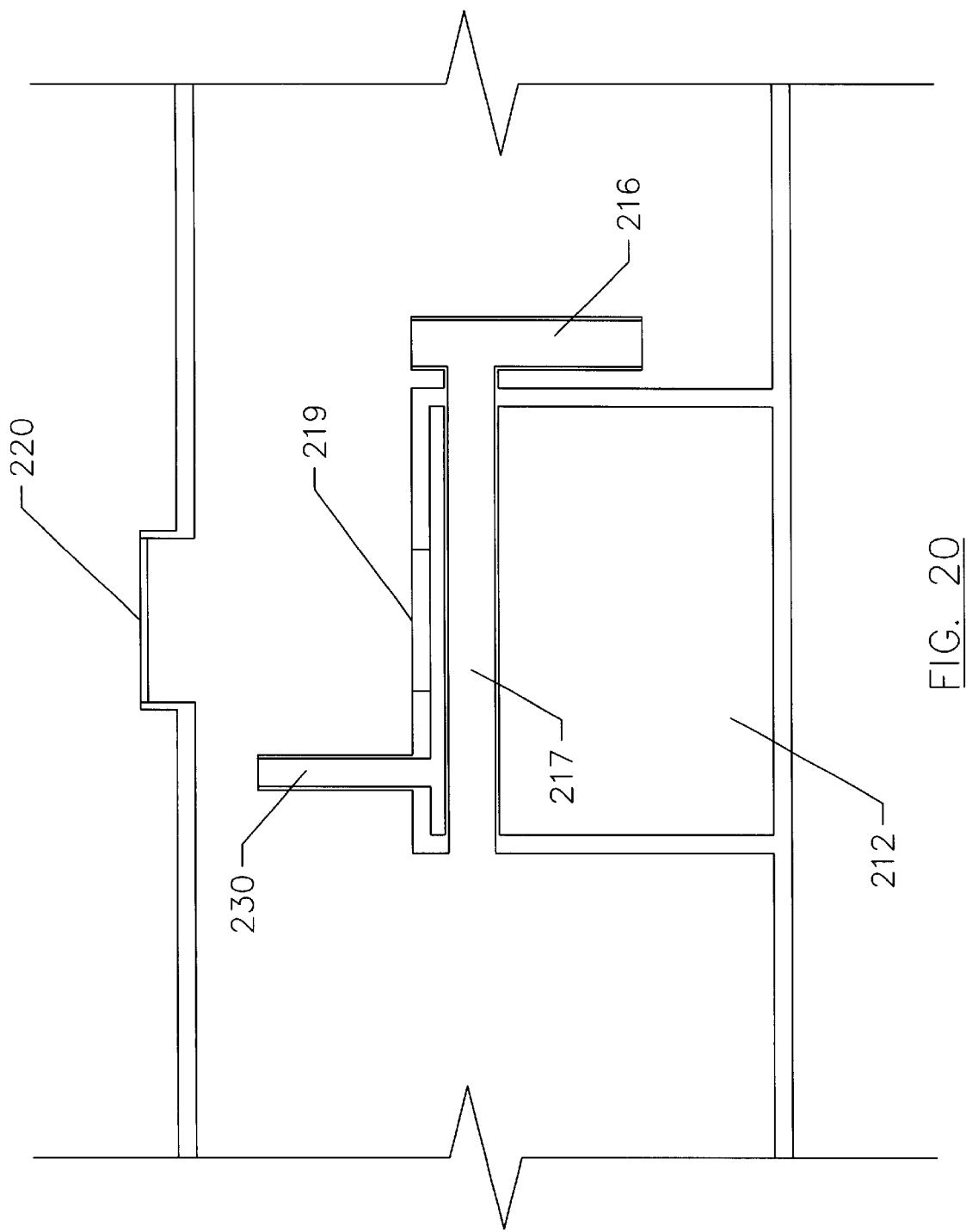

US 6,264,835 B1

APPARATUS FOR SEPARATING A LIGHT FROM A HEAVY FLUID

RELATED APPLICATION

This application claims the benefit of my copending Provisional application S.N. 60/117,910, filed Jan. 29, 1999.

BACKGROUND OF THE INVENTION

Apparatus that (a) receives run-off water from parking lots, filling stations, etc., (b) removes any oil that is in the run-off water and (c) delivers clean water to a river have been in widespread use. Generally, such apparatus has only two stages of operation, one stage being when the run-off water entering the apparatus has a low rate of flow and the other stage being when the run-off water entering the apparatus has a high rate of flow. With such apparatus the separation of the water and the oil is inadequate.

My U.S. Pat. No. 5,746,911, granted May 5, 1998 is an improvement upon the apparatus described above. It has three stages of operation, one of which is for low rate of flow of the run-off water, a second of which is for an intermediate rate of flow of the run-off water and a third of which is for high rates of flow of the run-off water. With the apparatus described in my aforesaid patent the ineffectiveness of the prior art at intermediate flow rates was overcome.

The conventional prior art performs the entire separation process in one tank whereas my aforesaid prior patent has one tank for receiving the incoming water and for feeding the water to an outlet and another tank wherein the water is separated from the oil. The fluid in the second tank remains very calm at all times and therefore the separation process is very efficient.

SUMMARY OF THE INVENTION

The present invention has a single tank with a divider which in effect provides two tanks. One of these two tanks is an inlet tank which receives the run-off water. When the run-off water is received at a low rate of flow the fluid level rises slowly until it passes over a weir and is then fed to the other tank which is the main separation tank. The fluid in the main separation tank is calm and therefore the separation process is very efficient.

The present invention has a single tank (sometimes hereinafter called a container) which has a divider which divides the container into two tanks. These two tanks have three separate paths for the incoming run-off water, one path for a low rate of flow of the run-off water, one for an intermediate rate of flow of such water and one for a high rate of flow.

In place of the L-shaped pipes 14 of my aforesaid prior patent, in the preferred form of my invention, I provide large vortex plates one for each tank, which divides the tank into three parts. The lowest of these three parts is the space in the tank which is at a lower level than the lower end of the vortex plate. That space allows water to flow under the vortex plate to the part of the tank outside of the vortex plate.

The second of the three parts is the part of the tank that is within the space defined by the vortex plate. An inlet pipe feeds raw run-off water into this space.

The third of these three parts is the space in the tank which is at a higher level than the level of the top end of the vortex plate.

When the run-off fluid has an intermediate rate of flow more water enters the inlet tank than can pass through the small opening of the weir. Hence, the level of the fluid within the vortex plate will rise forcing clean water out of the lower end of the space within the vortex plate. This clean water will then flow to the outlet pipe.

When the rate of flow of the incoming run-off water is very high, the water passes, over the vortex plate of the inlet tank, directly to the outlet.

The vortex plate in the main separation tank improves the separation process in that tank. The fluid enters that tank in the space surrounded by the vortex plate. Clean water is fed from the main separation tank to the clean water outlet of the apparatus.

BRIEF DESCRIPTION OF THE DRAWINGS

FIGS. 6, 7 and 8 are views of the device of FIG. 4 showing the input weir 13, the enclosure 13a and the pipe 20 which feeds water from enclosure 13a to the main separation tank 21.

FIGS. 9, 10, 11, 12 and 13 show the details of outlet pipe 18 and its associated parts, of the device of FIG. 4.

FIG. 20 is a sectional view along line 20—20 of FIG. 16.

DETAILED DESCRIPTION OF THE PREFERRED FORM OF THE INVENTION

The objects and uses of the present invention are the same as in the case of my said prior U.S. Pat. No. 5,746,911.

Figure 1:
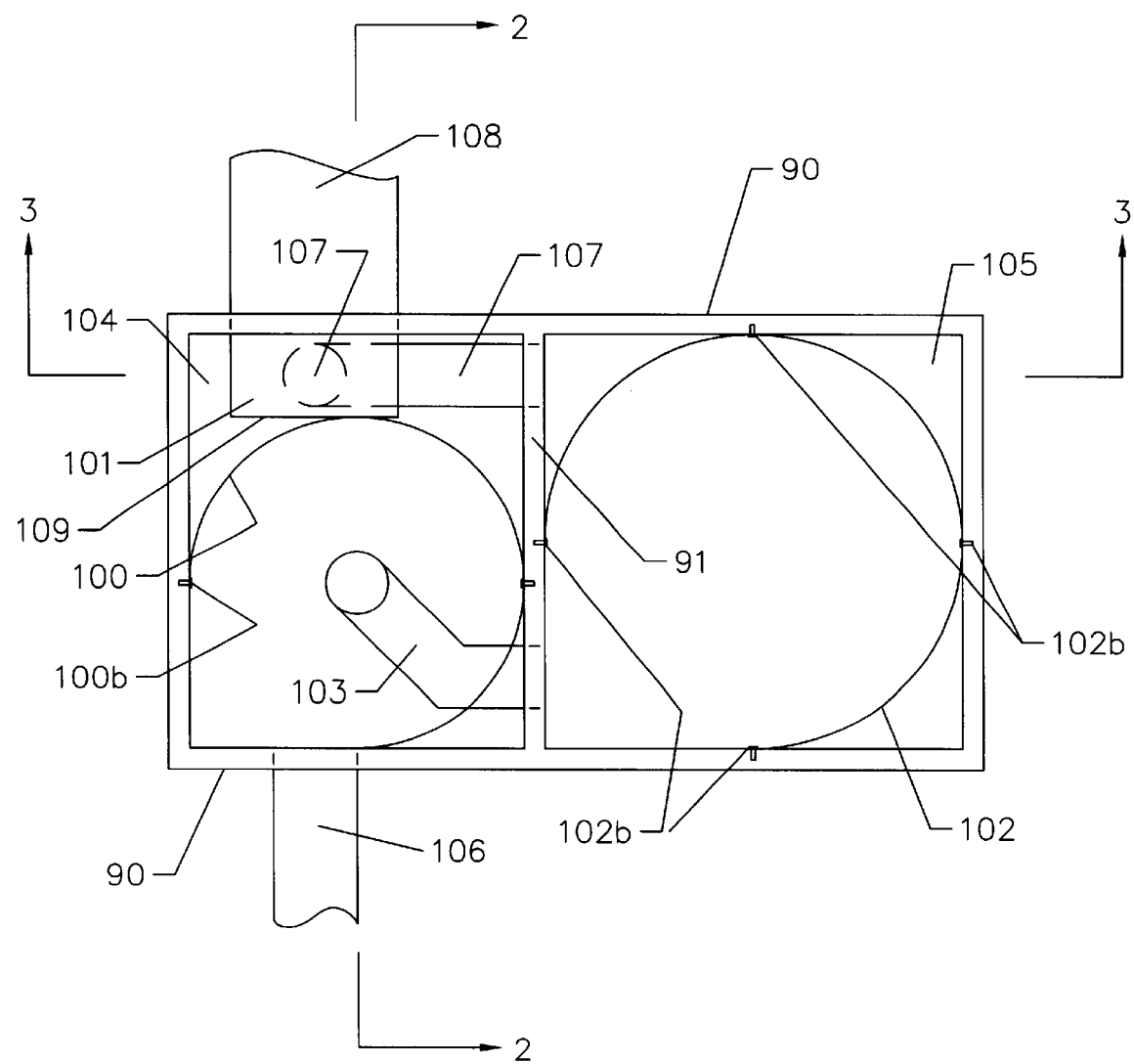
FIG. 1 is a plan view of the preferred form of the invention.
Figure 2:
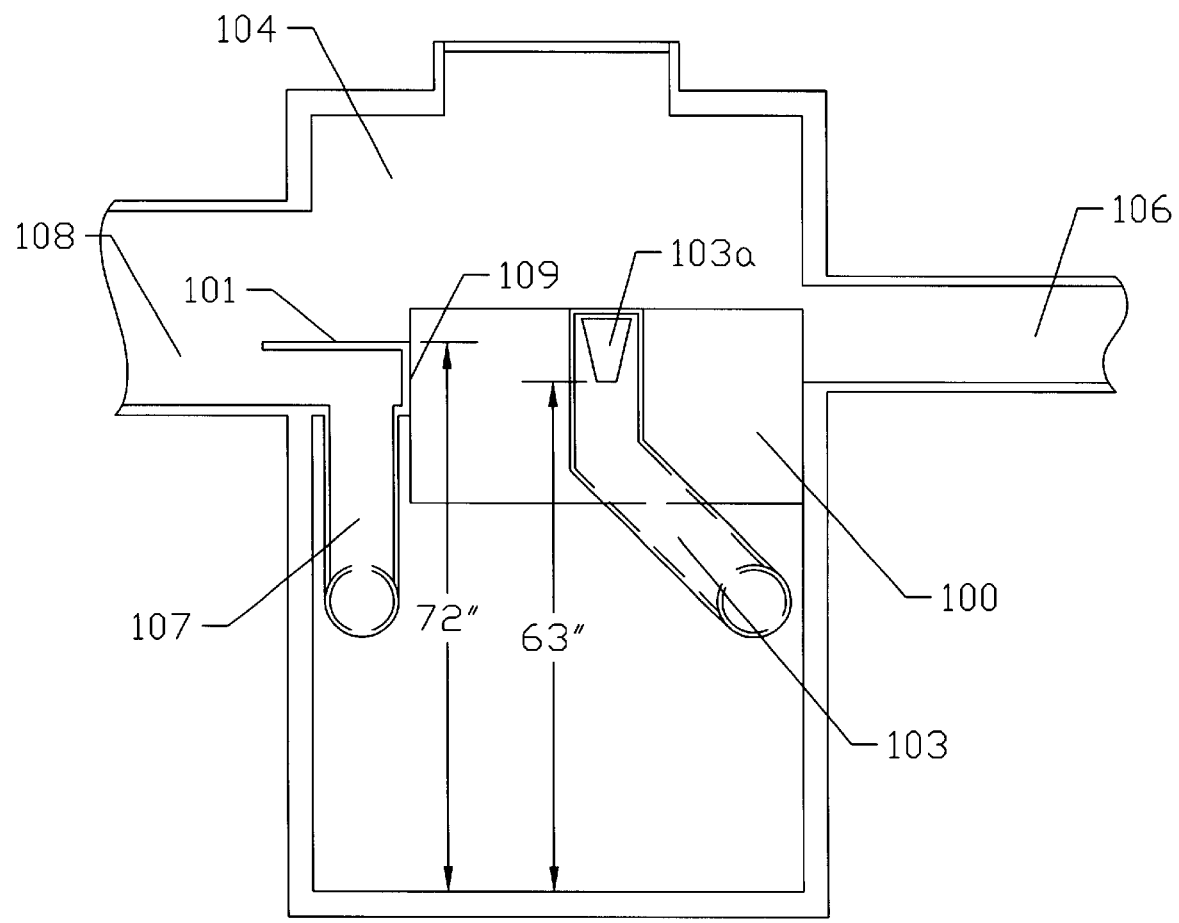
FIG. 2 is a sectional view of the preferred form of my invention taken along line 2—2 of FIG. 1.
Figure 3:
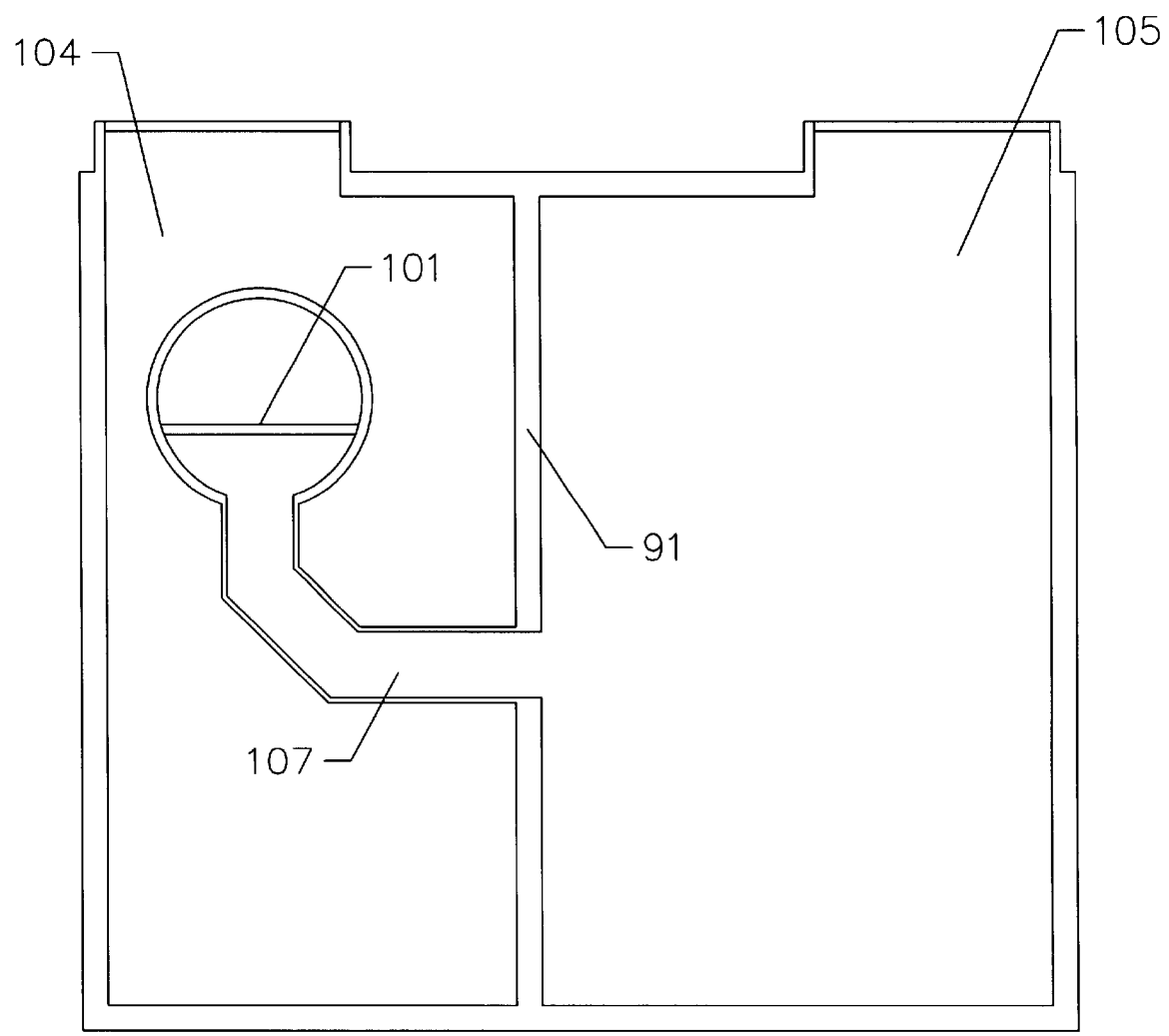
FIG. 3 is a sectional view taken along line 3—3 of FIG. 1 and shows both tanks 104 and 105.

FIGS. 1 to 3 illustrate the preferred form of the invention.

In FIG. 1, there is a container 90 having a divider 91 that divides the container 90 into two tanks 104 and 105.

In FIGS. 1 to 3 there is an input tank 104 and a supplemental separation tank 105. An inlet pipe 106 receives run-off water from a filling station or a parking lot and delivers that water to tank 104. The run-off water may contain oil and may vary from a very low flow rate to a very high flow rate. The input tank 104 has a pipe 103 that feeds water into that portion of tank 105 which is surrounded by the cylindrical vortex plate 102. The pipe 103 has a V-shaped opening 103a at its upper end through which the water from tank 104 flows into tank 105. The lowest part of opening 103a is at about the same elevation as the lowest part of the opening in inlet pipe 106, and the lowest part of opening 103a is substantially below the level of the top of horizontal wall 101. The upper portion of opening 103a is at a higher elevation than the horizontal wall 101. See FIG. 2 for the relative elevations of the opening 103a and wall 101.

The outlet pipe 108 feeds the clean water to a river, sewer or other place of disposal. The upstream or inlet end of pipe 108 is partially closed at the lowest part of its inlet end by horizontal wall 101 and vertical wall 109. Thus, the chamber formed by the walls 101 and 109 is closed at its bottom, except that pipe 107 will feed water through that bottom, and is closed at its right end 109 (FIG. 2) and its top 101.

Pipe 107 feeds clean water from a place just below the middle of the height of tank 105, and outside the cylindrical vortex plate 102, to the outlet pipe 108.

The tank 104 has a cylindrical vortex plate 100 that defines a space which receives the water from input pipe 106 and limits the flow of oil to the confines of said plate 100. Clean water below the surface oil is forced out of the lower end of the plate 100 when added water enters the input 106 at a faster rate than water flows into pipe 103 from opening 103a.

Similarly, in tank 105, the oil is limited to the confines of cylindrical vortex plate 102. The liquid on the downstream side of the plate 102, in tank 105, is clean water.

Figure 3A:
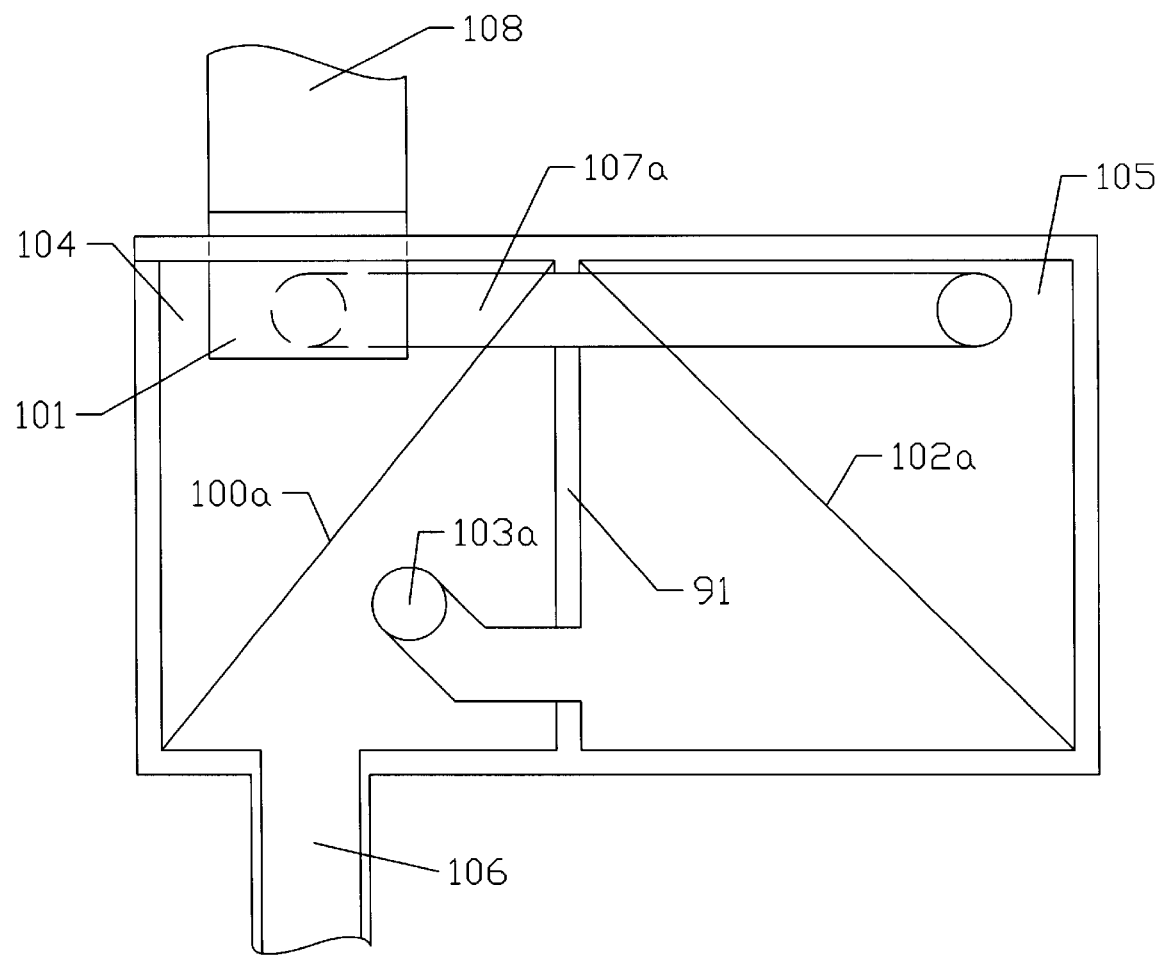
FIG. 3a is a plan view of the same apparatus as shown in FIG. 1, except that the vortex plates 100a and 102a are flat in place of the curved plates 100 and 102 of FIG. 1.
Figure 4:
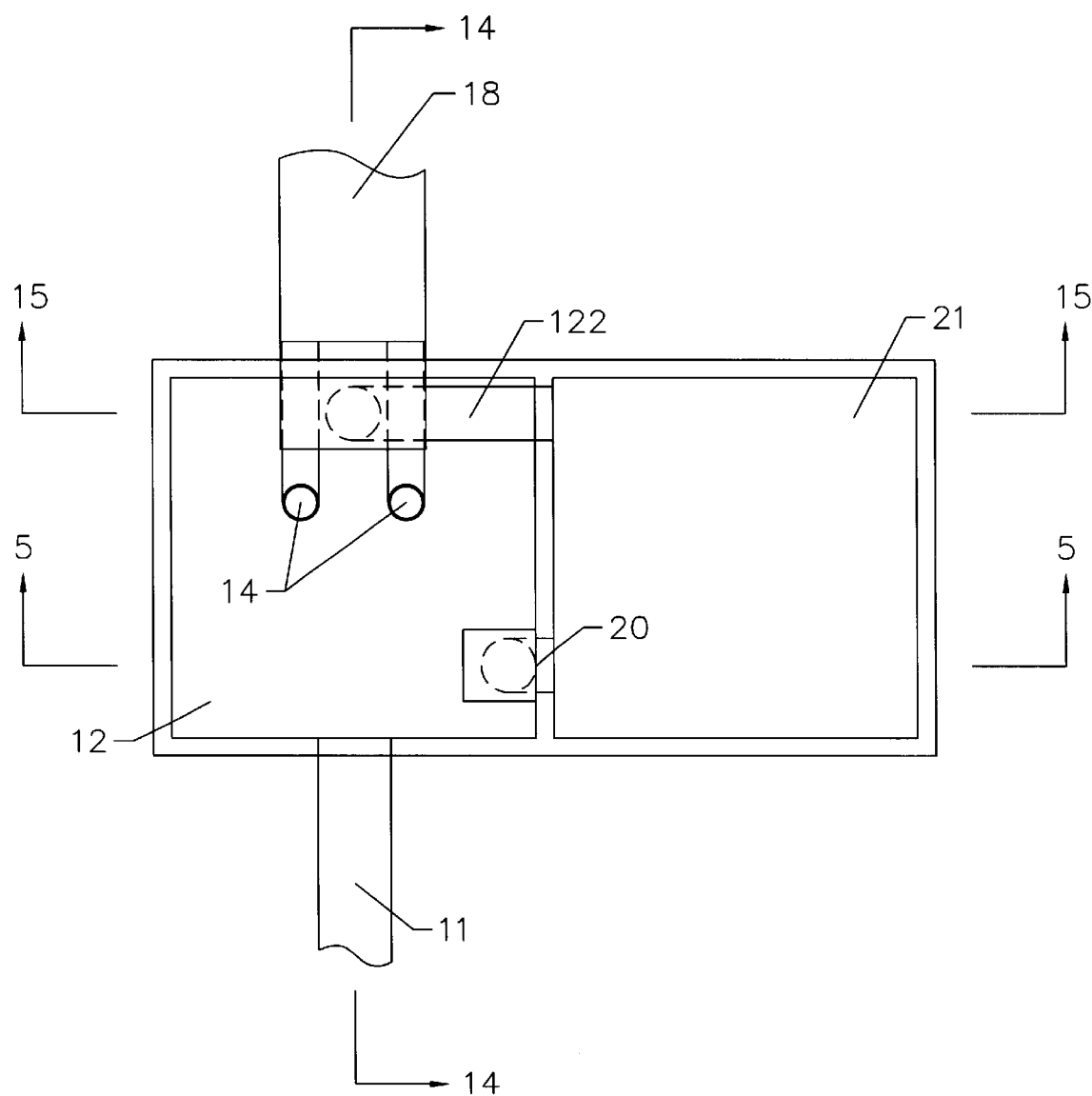
FIG. 4 is a plan view of a First Modified Form of my invention.

Instead of cylindrical plates 100 and 102 the plates may be flat plates extending between two walls of the applicable tank to define one body of water that has an oil surface and another body of water that is clean, as shown in FIG. 3a.

In both FIGS. 1 and 3a, the oil is confined by the inside (upstream) face of plates (barriers) 100 and 100a, respectively.

In FIGS. 1 and 3a, the pipes 107 and 107a, respectively, receive their clean water from the lower part of tank 105, and preferably from a point in the tank that is separated from the inlet (103 or 103a) by the barrier (102 or 102a) or from a part of the tank vertically below such point.

The vortex plates 100 and 102, preferably were, prior to their installation, flat sheets of a transparent resilient material, such as stainless steel or alternatively a plastic. Each of these plates was then manually rolled into a cylinder and slipped into position in its respective tank where it then unrolls due to its tendency to return to its original flat state. As it unrolls its ends press tightly against inner side walls of the tank to form a substantially leak-proof connection. A rubber gasket may be placed over the ends of the plates to reduce leakage but generally this is not necessary. The vortex plates may readily be adjusted upwardly or downwardly manually.

The vortex plates 100 and 102 are sometimes hereinafter called barriers. They may be secured in place by bolts 100b and 102b. Similarly, they may have legs that extend to the bottom of the tank.

Operation of the Preferred Form

When the run-off water entering pipe 106 has a very low rate of flow, the water in tank 104 rises slowly and when it reaches the level of the lower end of opening 103a, passes via pipe 103 to the tank 105. In tank 105 the oil floats on the top of the water and within the cylindrical vortex plate 102. The tank 105 is filled with clean water up to the level of the upper end of pipe 107, before use of the apparatus begins.

Hence the water that will thereafter enter pipe 107 is clean water that is fed to pipe 107 from an elevation in tank 105 that is below the level of the oil surface.

Therefore, as oil-laden run-off water enters tank 104 via pipe 106 at a low rate of flow, it causes surface water in tank 104 to flow via pipe 103 to tank 105. This forces a corresponding amount of clean water from tank 105 to flow via pipe 107 to outlet pipe 108 and from there to a nearby river or other disposal place.

Next let it be assumed that the amount of rain increases somewhat. Hence, there is an intermediate rate of flow of run-off water entering tank 104 via pipe 106 at a faster rate than the water will flow through opening 103a. The fluid level within the cylindrical vortex plate 100 will rise thus causing clean water to flow out of the open lower end of the space defined by the cylindrical vortex plate 100 and raise the clean water level in tank 104 to a level higher than horizontal wall 101 so that clean water from tank 104 will flow outwardly, through pipe 108 to the river or other disposal place.

If, however, the rain is very heavy so that the flow, into tank 104, via pipe 106 is a very high rate of flow, a small amount of the water in tank 104 will flow via opening 103a to tank 105. In addition some water will take the intermediate flow path described in the immediately preceding paragraph. The remainder of the water will flow from inlet pipe 106 over the cylindrical vortex plate 100 and pass directly to the outlet pipe 108.

Detailed Description of a First Modified Form of the Invention

The objects and uses of this form of the invention are the same as in the case of my said prior U.S. Pat. No. 5,746,911. Indeed, the reference numbers 11, 12, 13, 14, 18, 20, 21 and 122 perform the same functions, respectively, as the corresponding parts of FIG. 1 of my aforesaid prior patent '911, except as explained below.

Figure 5:
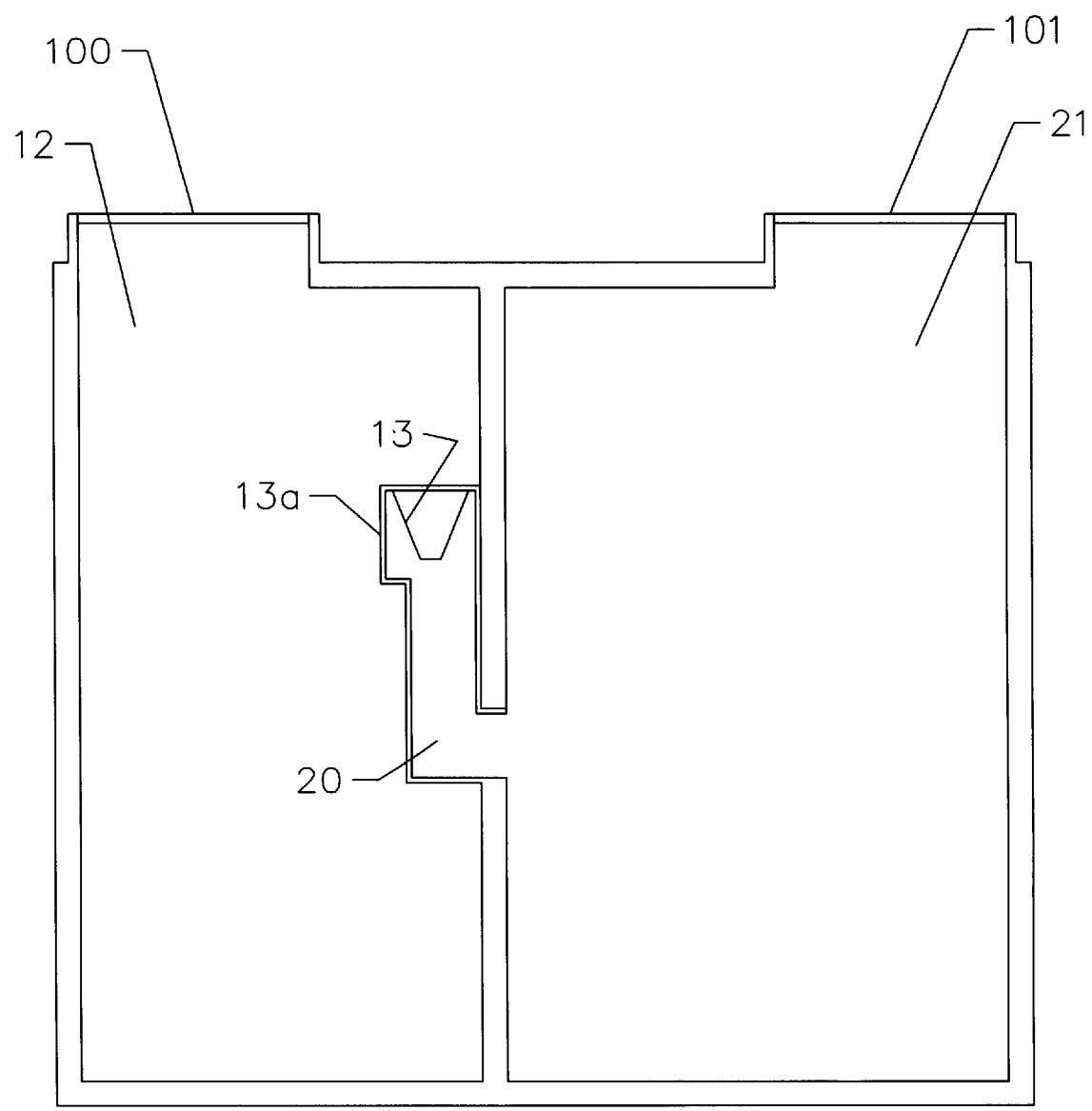
FIG. 5 is a sectional view of the apparatus of FIG. 4 and which shows the details of the weir 13 and its outlet pipe 20.
Figure 12:
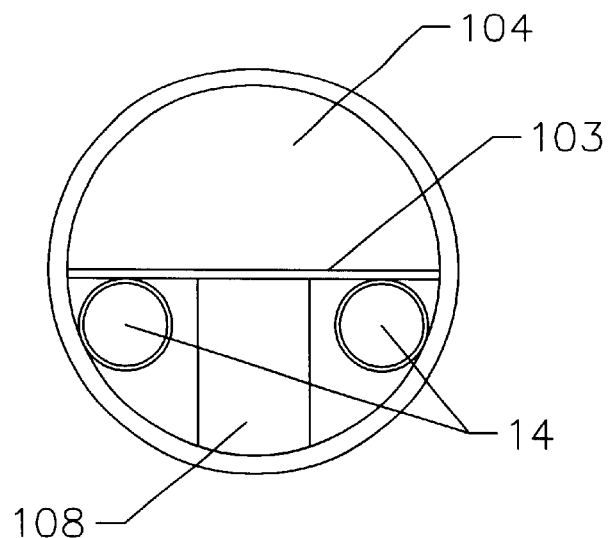
Figure 13:
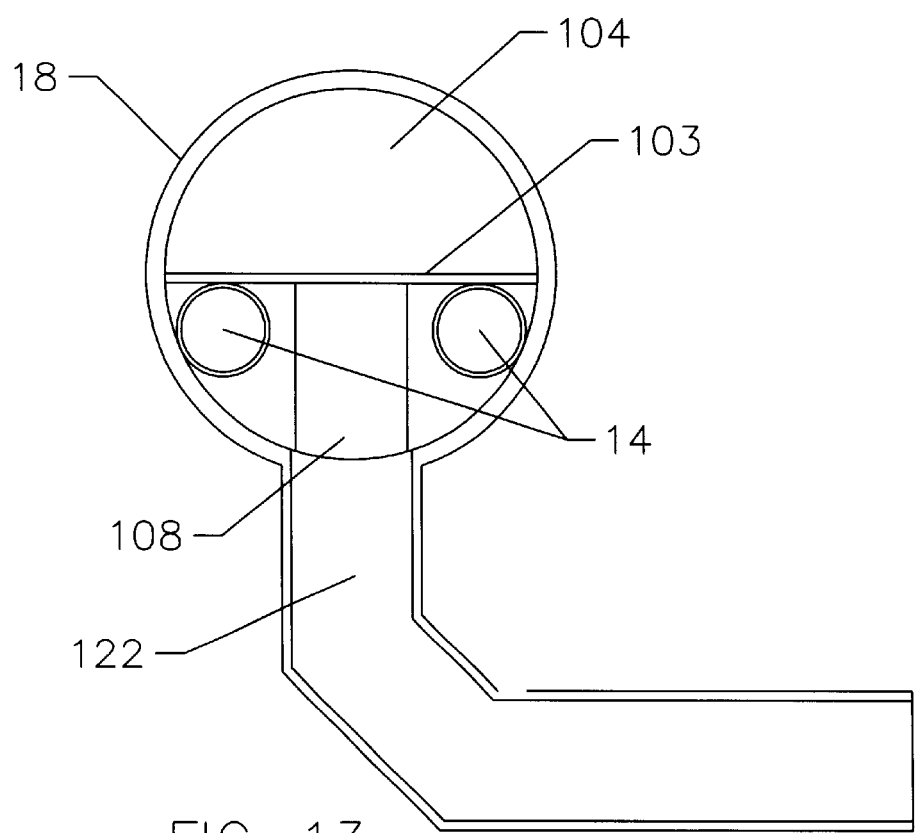
Figure 14:
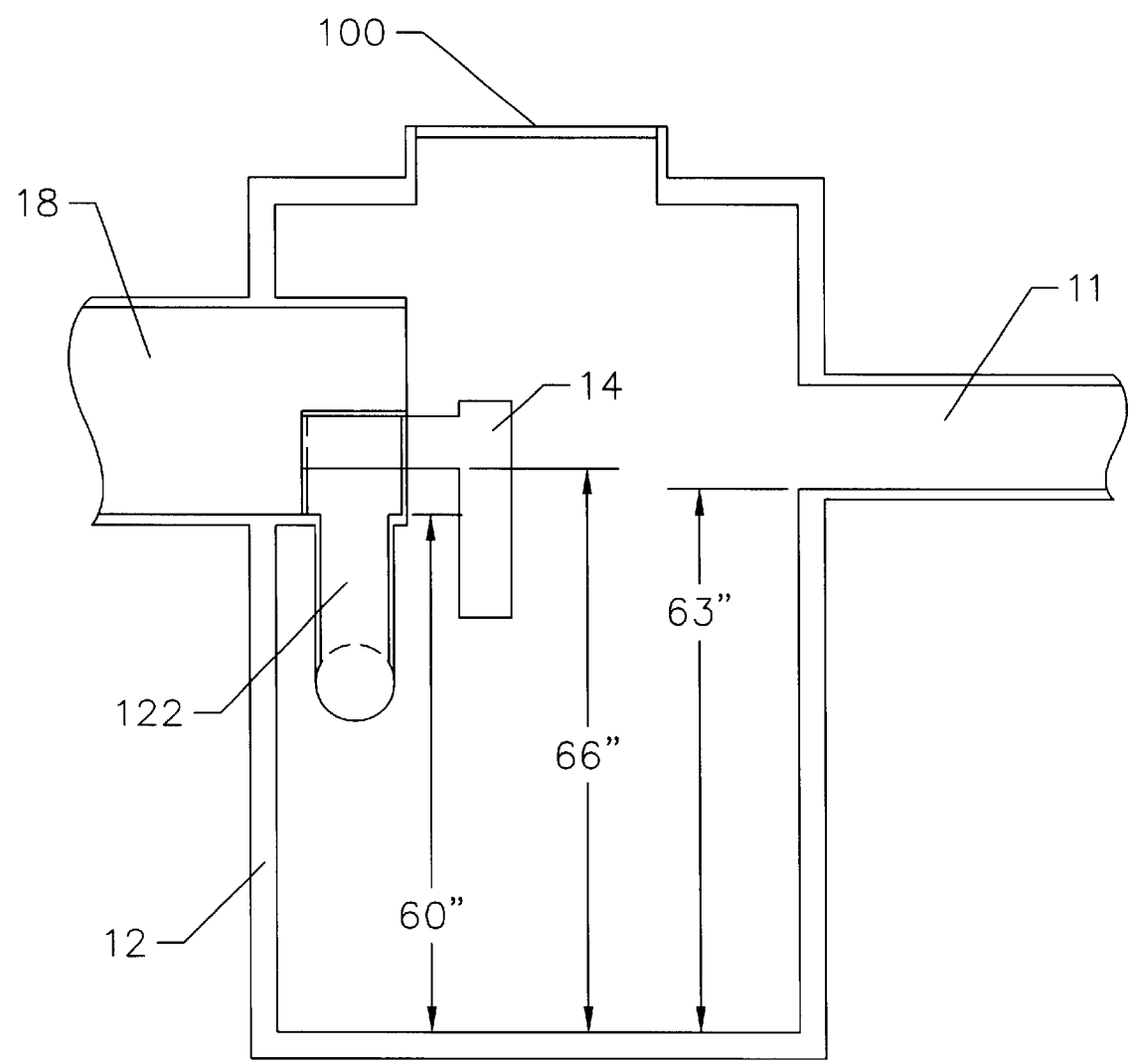
FIG. 14 is a sectional view along line 14—14 of FIG. 4 and shows the relation of the inlet tank 12, the inlet pipe 11, and the output pipe 18 and its associated parts, of the device of FIG. 4.

Run-off rain water, polluted by oil, from a parking lot, filling station, etc. enters tank 12 via inlet pipe 11. When the water builds up above the elevation of weir 13 (FIG. 5) it enters enclosure 13a and is then flows, due to gravity, via pipe 20 to the main separation tank 21. In both tanks 12 and 21 the oil floats on the surface of clean water, however since there is less turbulence in tank 21, than in tank 12, the separation in tank 21 will be better than in tank 12.

There is a pipe 122 (FIGS. 9 to 11) that feeds clean water (below the level of the oil) from tank 21 to outlet pipe 18. The entire length of pipe 122 must be at a lower elevation than the weir 13. The enclosure 108 (FIG. 11) receives the water from pipe 122 and is open at its downstream end so that the water from pipe 122 discharges into outlet pipe 18.

Each of tanks 12 and 21 has a removal lid. Handles 100 and 101 are on the two lids, respectively. The tanks may be cleaned when the lids are removed.

Figure 15:
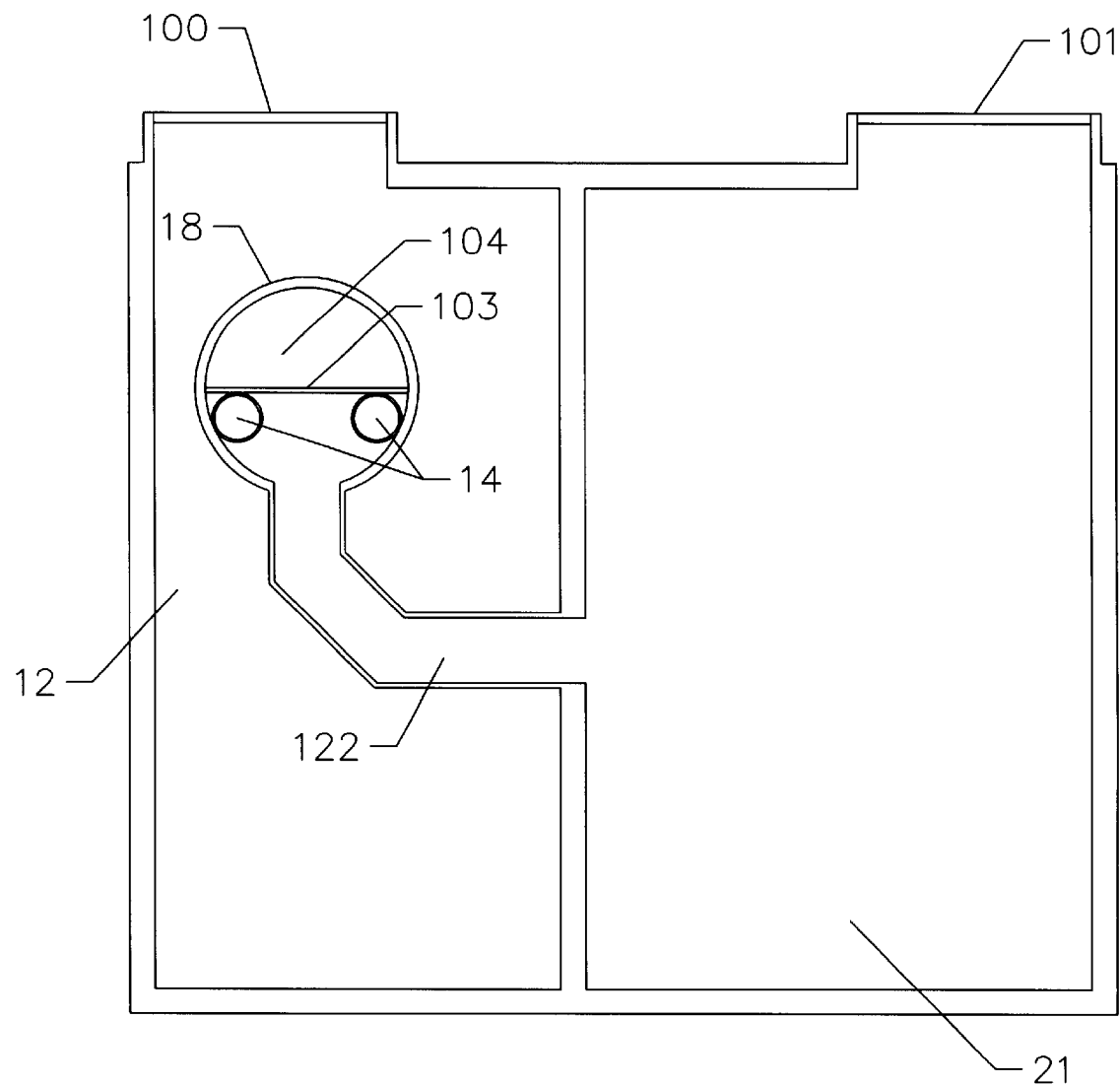
FIG. 15 shows the relation of inlet tank 12, the main separation tank 21, the outlet pipe 18 including its associated parts and the return pipe 122 which passes clean water from tank 21 to the outlet pipe 18, of the device of FIG. 4.

As shown in FIGS. 11 and 15, the lower half of the inlet end of outlet pipe 18 is covered by semi-circular (half of a round) plate 103. Water, therefore, cannot enter the lower half of said inlet end of pipe 18, but can enter via pipe 122 and via the open upper half 104 of said inlet pipe 18.

The pipes 14 are of an inverted L-shape. The vertical leg of each L is open at its lower end and also at its upper end 14a (FIG. 11).

Operation of the First Modified Form

When rain water falls on a parking lot, the rain water that is first to run-off is usually contaminated with oil and enters tank 12 via pipe 11. When the level of the water rises to the elevation of the weir 13, the oil on the surface of the water enters weir 13. As further run-off water and oil enters weir 13, the level of the fluid in tank 21 rises. If the rain falls at a very low rate and has built up to the level of weir 13, surface water and oil passes over the weir 13 to the tank 21 via pipe 20.

However, if the rainfall has an intermediate flow rate it flows into the tank 12 faster than it can flow past weir 13, hence it builds up in tank 12. When such build-up in tank 12 reaches slightly above the level of the horizontal arms of L shaped pipes 14, flow in pipes 14 begins in addition to continued flow over weir 13. Thus, clean water, that is water from below the oil surface of tank 12, flows up the vertical legs of the inverted L-shaped pipes 14 and then along the horizontal arms of pipes 14 to the outlet pipe 18.

If, however, the volume of the rainfall is very great, flow not only continues through weir 13 and pipe 20, and through pipes 14, but also directly from the outlet end of inlet pipe 11 directly across the water in tank 12 to the opening 104 of outlet pipe 18. Usually, however, before water flows from inlet pipe 11, directly to outlet pipe 18, the oil has already been removed from the water, since the water passed over the weir 13, and through pipes 14, for a substantial time period.

The upper ends 14a of pipes 14 are open. This permits water, when there is a very high rate of flow, to enter the horizontal arms of pipes 14 from the top and flow into the outlet pipe 18, in addition to the water passing directly across the tank 12 (from inlet pipe 16 to opening 104 in the outlet pipe 18).

Detailed Description of a Second Modified Form of the Invention

FIGS. 16 to 20 show apparatus for retrofitting some existing systems for separating oil from run-off water with my invention.

Figure 16:
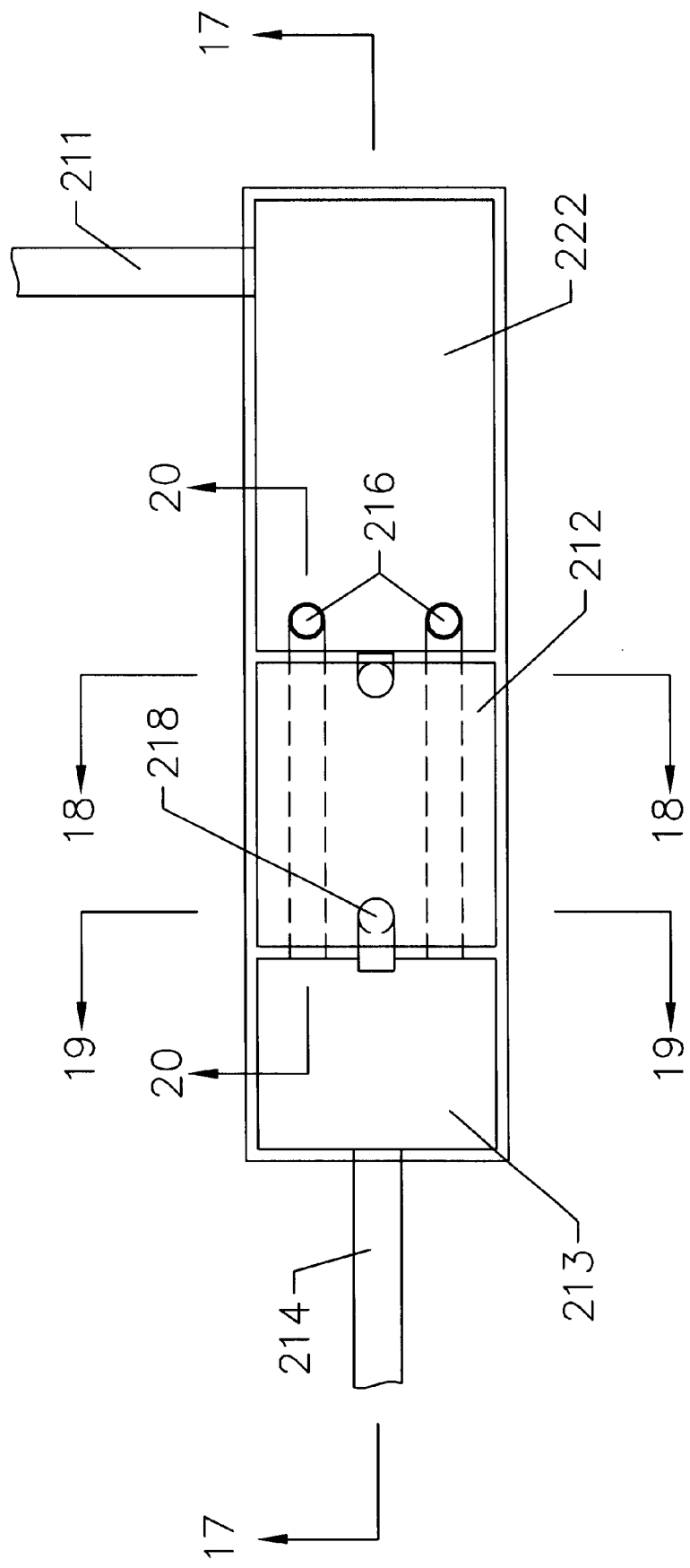
FIG. 16 is a plan view of a Second Modified Form of my invention.
Figure 17:
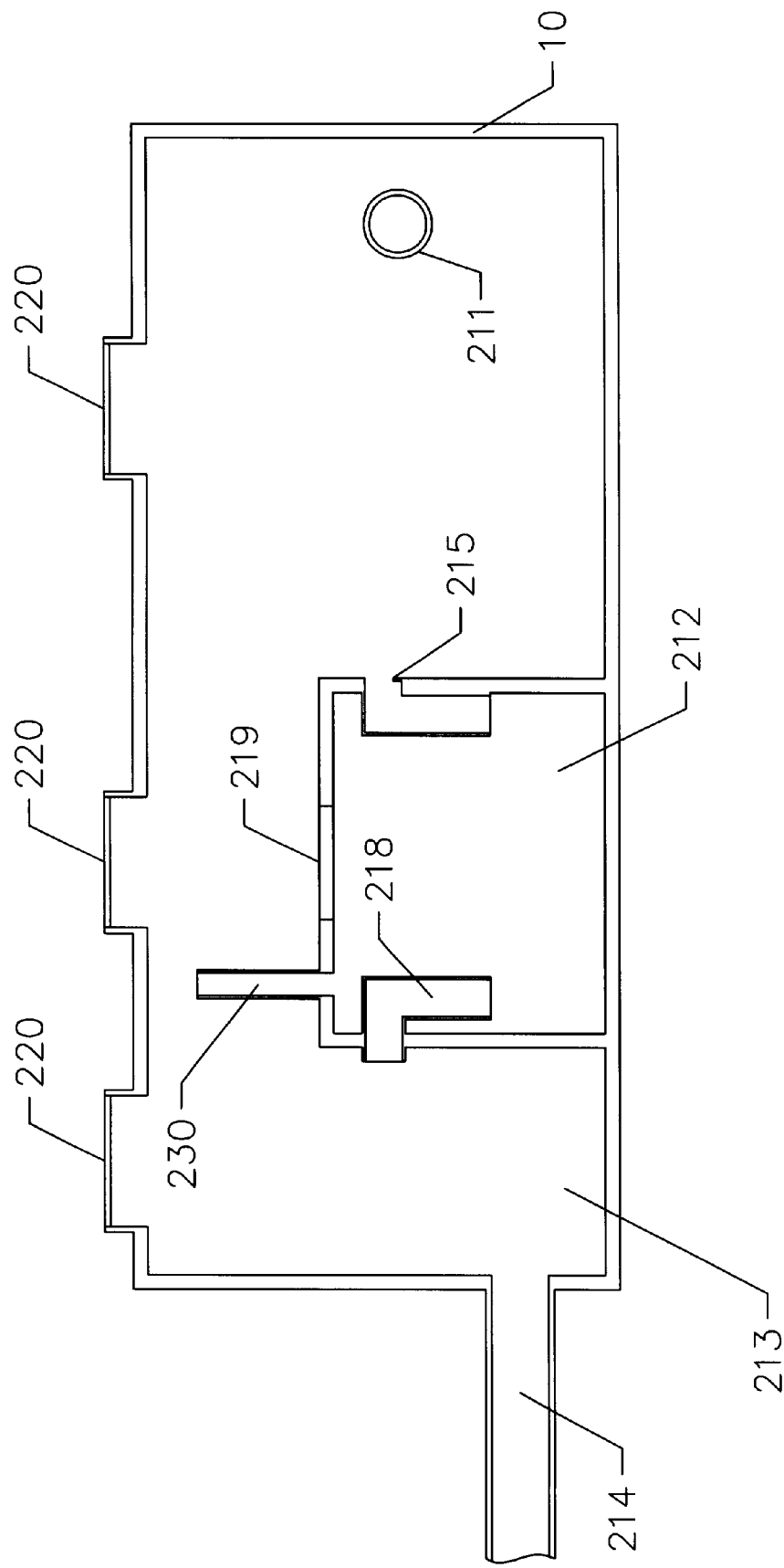
FIG. 17 is a sectional view along line 17—17 of FIG. 16.
Figure 18:
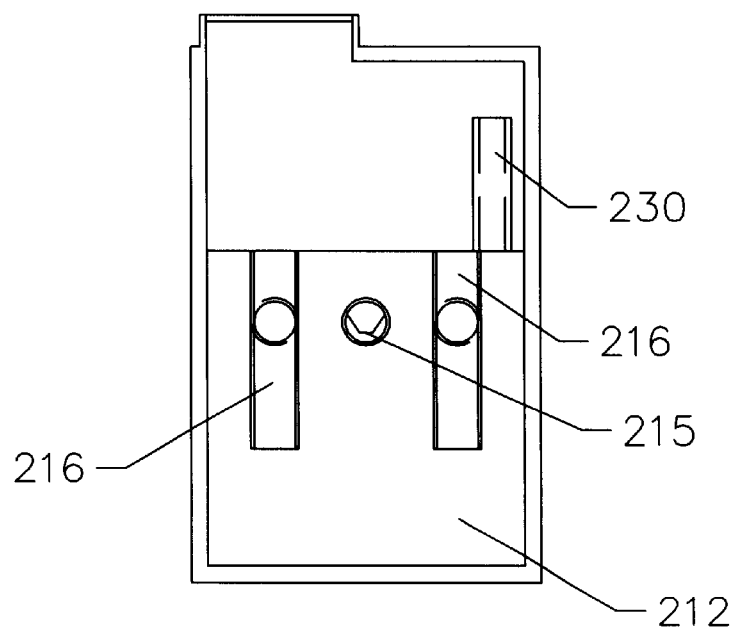
FIG. 18 is a sectional view along line 18—18 of FIG. 16.
Figure 19:
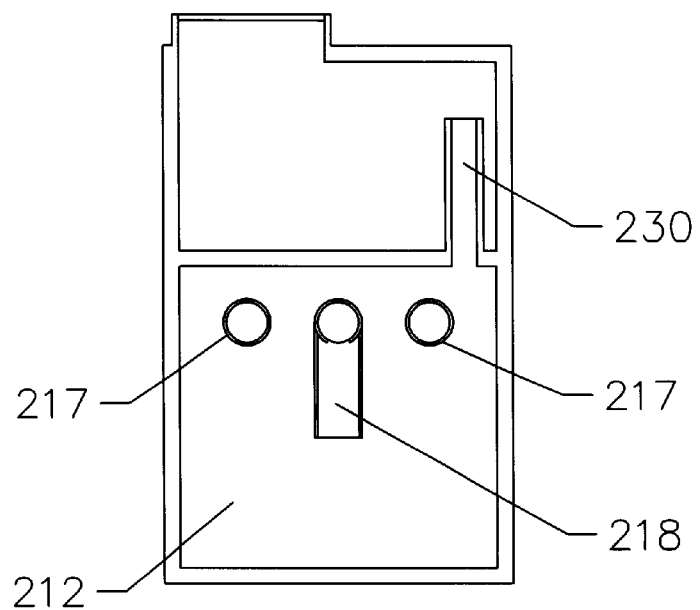
FIG. 19 is a sectional view along line 19—19 of FIG. 16.

In FIG. 16 there is shown an underground tank 210 with an inlet pipe 211 and an outlet pipe 214. Those three parts were parts of a previously installed prior art system for separating the oil from run-off water. The working parts of such prior art systems have been replaced with my system.

As shown in FIG. 16, there is a main concrete tank 210 mounted underground. Run-off water from a parking lot or other source enters tank 222 via inlet pipe 211. There is a storage chamber 212.

There is an outlet chamber 213 and an outlet conduit 214.

The storage chamber 212 has a weir 215, and two elbow pipes 216. The lower part of the opening of weir 215 is at a lower level than the horizontal portion 217 of the elbow pipes 216. The storage chamber 212 contains the inlet end of an elbow pipe 218. The outlet end of elbow pipe 218 feeds water to chamber 213. There are manholes 219 and manhole covers 220.

Operation of the Second Modified Form of the Invention

When the rate of flow at input 11 is very low the incoming liquid builds up in section 222 of tank 10. When the fluid level rises to the level of the weir 215 oil flows over the weir 215 and into storage chamber 212. When the fluid in chamber 212 builds up to the level of the horizontal portion of elbow pipe 218, clean water in storage chamber 212 flows out elbow pipe 218 to outlet chamber 213 and later to outlet pipe 214. The oil, however, remains in storage tank 212.

When the rate of flow in inlet pipe has an intermediate flow rate, the water builds up in section 222 faster than it can flow over weir 15 and not only flows over weir 215 but also through the elbow pipes 216, 217 to the outlet chamber 213, and thence to outlet pipe 214.

When the rate of flow at inlet pipe 11 is very high, the fluid in section 222 passes not only through weir 215 and elbow pipes 216, 217, but also overflows the top of storage chamber 212 and goes direct to the outlet chamber 213 and outlet 214.

The above system may be used to retrofit an existing tank 210 by replacing the existing contents of that tank with storage chamber 212. This is done by adding the weir 215 and the elbow pipes 216 and 217, as well as all of the structure necessary to support and house the foregoing added parts.

I claim to have invented:

1. Apparatus for receiving run-off water that may have a low flow rate or an intermediate flow rate or a high flow rate and for removing oil from the run-off water, comprising:

a container, first means including a divider that divides said container into first and second tanks, said container having an inlet for receiving run-off water from said inlet and a clean water outlet, said first means defining a path, for fluid that has attained at least a predetermined depth in said first tank, that passes at least some of that fluid from said first tank to said second tank, said path limiting the passage of fluid therethrough thereby permitting the fluid in the first tank to rise above said predetermined depth when the run-off water entering the first tank has said intermediate rate of flow, outlet means which includes said clean water outlet, second means which, when the run-off water received by said first tank is at said intermediate rate of flow, passes clean water from below the surface of the fluid in said container to said outlet means, said outlet means including means that receives clean water from below the surface of said container, said inlet and said clean water outlet, of said container, being positioned for substantially direct flow from said inlet to said clean water outlet during said high flow rate.

2. Apparatus as defined in claim 1 in which said first tank has a bottom, said second means confining a portion of the surface fluid that may contain oil to an area of said surface that directly receives run-off water from said inlet, said second means being spaced from said bottom to allow clean water, from below any oil on said surface, to flow under said second means to said outlet means.

3. Apparatus as defined in claim 1 in which said second means comprises means for limiting any oil on the surface of the water in said first tank to a limited portion of said surface adjacent said inlet and for allowing clean water from below said surface oil to flow to said outlet means.

4. Apparatus as defined in claim 1 in which said second means is a curved barrier which confines oil on the surface of the water in said first tank to a limited area which is adjacent said inlet, said first tank having a bottom, said barrier being spaced above said bottom to allow flow of clean water under the barrier.

5. Apparatus as defined in claim 4 in which said curved barrier is resilient and applies pressure against said first tank, for holding said barrier in a position above said bottom.

6. Apparatus as defined in claim 1 in which said second means is a substantially flat plate which acts as a barrier and limits the oil on the surface of run-off water in said first tank to a limited portion of said surface that is adjacent said inlet but does not extend to said outlet.

7. Apparatus as defined in claim 1 in which said second tank and said divider comprise an enclosure located in said container,
said first means having a weir, in said enclosure, which forms said path and constitutes a restriction,
said outlet means including a clean water outlet path which receives clean water from below the surface of the liquid in said enclosure.

8. Apparatus as defined in claim 7 in which said enclosure and said container define a space, in said container, fed by said input and holding run-off water that enters said weir when its depth rises to the level of said weir.

9. Apparatus as defined in claim 7 in which said outlet means includes a space, for clean water, defined by said container and said enclosure.

10. Apparatus as defined in claim 9 in which said container and said enclosure form a space that receives run-off water from said inlet and feeds water to said weir,
said enclosure being smaller than said container to permit run-off water entering said inlet at a high rate of flow to flow around said enclosure to said space for clean water.

11. Apparatus as defined in claim 1 in which said means for defining said path is closely adjacent to and supported by said divider and is spaced from said clean water outlet.

12. Apparatus as defined in claim 1 in which each of the first and second tanks has a bottom and also has a barrier that is positioned in spaced relation to the bottom of the tank and provides the tank with a first surface area that contains the oil and a second surface area that contains clean water on its surface as well as in the space vertically below such second area,
each tank having its inlet feeding fluid to its said first area,
each tank feeding at least some of said clean water to said outlet means.

13. Apparatus for removing oil from water, comprising:
a tank having an upper end and a bottom,
a vertical barrier in said tank which is spaced from said upper end,
an inlet to said tank, for water that contains oil,
said barrier cooperating with the tank to provide a confined space open at its top and bottom for confining oil that enters the tank through said inlet,
said inlet feeding oil and water, to be processed, into said confined space,
said barrier being spaced upward from said bottom to provide a path for clean water, that is below said oil, that passes under said barrier and then to parts of the tank outside said confined space, and
an outlet for said tank for receiving clean water from outside of said confined space.

14. Apparatus as defined in claim 13 in which said barrier is a curved resilient member that holds itself in place in said tank by reason of its resilence.

15. Apparatus as defined in claim 13 in which said tank has at least three sides and said barrier is a flat plate that forms a triangle with at least two of said sides.

16. Apparatus as defined in claim 13 in which said tank is the second tank of the apparatus,
said apparatus having a first tank,
an inlet to the first tank for feeding water polluted by oil into said first tank, and
a conduit for receiving surface water and oil that is in the first tank and feeding it to said inlet of said second tank.

17. Apparatus as defined by claim 16 in which said outlet is positioned to receive clean water that has passed under said barrier.

18. Apparatus as defined in claim 13 for receiving run-off water that may vary from a low to a high rate of flow, in which said inlet and said outlet are positioned for substantially direct flow from said inlet and said outlet during periods of said high rate of flow.

19. Apparatus for receiving run-off water that may have a low flow rate or an intermediate flow rate or a high flow rate and for removing oil from the run-off water, comprising:
a container,
a divider that divides said container into first and second tanks,
said container having an inlet for delivering run-off water to said first tank and a clean water outlet,
a conduit defining a path, for fluid that has attained at least a predetermined depth in said first tank, that passes at least some of that fluid from said first tank to said second tank,
said path having a restriction that restricts the passage of fluid therethrough thereby permitting the fluid in the first tank to rise above said predetermined depth when the run-off water entering the first tank has said intermediate rate of flow,
a passageway which, when the run-off water received by said first tank is at said intermediate rate of flow, passes clean water from below the surface of the fluid in said container to said outlet means,
a passageway that receives clean water from below the surface of said container and feeds that water to said outlet,
said inlet and said clean water outlet, of said container, being positioned for substantially direct flow from said inlet to said clean water outlet during said high rate of flow.

20. Apparatus as defined in claim 19 in which said container and said divider comprise an enclosure located in said container,
said conduit having a weir, in said enclosure, which forms part of said path and constitutes said restriction,
a clean water outlet passageway which receives clean water from below the surface of the liquid in said container and feeds that water to said outlet.

21. Apparatus as defined in claim 20 in which said enclosure and said container define a space, in said container, fed by said input and holds run-off water that enters said weir when its depth rises to the level of said weir.

22. Apparatus as defined in claim 20 in which said outlet includes a space, for clean water, defined by said container and said enclosure.

23. Apparatus as defined in claim 22 in which said container and said enclosure form a space that receives run-off water from said inlet and feeds water to said weir,
said enclosure being positioned in said container to permit run-off water entering said inlet at a high rate of flow to flow above said enclosure to said clean water outlet.

24. Apparatus as defined in claim 19 in which each of the first and second tanks has a bottom and also has a barrier that is positioned in spaced relation to the bottom of the tank and provides the tank with a first surface area that contains the oil and a second surface area that contains clean water on its surface as well as in the space vertically below such second area, each tank having its inlet feeding fluid to its said first area, each tank feeding at least some of its clean water to said outlet.

25. Apparatus for receiving run-off water that may have a low flow rate or an intermediate flow rate or a high flow rate and for removing oil from the run-off water, comprising:

a container, a divider that divides said container into first and second tanks, said container having an inlet for receiving run-off water and a clean water outlet, a first passageway, for fluid that has attained at least a predetermined depth in said first tank, that passes at least some of that fluid from said first tank to said second tank, said passageway having an opening that limits the passage of fluid therethrough thereby permitting the fluid in the first tank to rise above said predetermined depth when the run-off water entering the first tank has said intermediate rate of flow, a second passageway which, when the run-off water received by said first tank is at said intermediate rate of flow, passes clean water from below the surface of the fluid in said container to said outlet, and a third passageway that receives clean water from below the surface of said container and feeds that water to said outlet, said divider limiting any oil on the surface of the water in said container to a limited portion of said surface adjacent said inlet.

26. Apparatus as defined in claim 24 in which said divider is a curved barrier which confines oil on the surface of the water in said container to a limited area which is adjacent said inlet, said first tank having a bottom, said barrier being spaced above said bottom to allow flow of clean water under the barrier.

27. Apparatus as defined in claim 26 in which said curved barrier is resilient and applies pressure against said container, for holding said barrier in a position above said bottom.

* * * * *